United States Patent
Miyazaki

[11] Patent Number: 5,521,788
[45] Date of Patent: May 28, 1996

[54] ELECTRIC VEHICLE CONTROL DEVICE

[75] Inventor: Akira Miyazaki, Tokyo, Japan

[73] Assignee: Kabushiki Kaisha Toshiba, Kawasaki, Japan

[21] Appl. No.: 138,964

[22] Filed: Oct. 21, 1993

[30] Foreign Application Priority Data

Oct. 23, 1992 [JP] Japan .................................. 4-285612

[51] Int. Cl.⁶ ..................................................... H02H 3/18
[52] U.S. Cl. ................. 361/42; 307/82; 307/86; 318/500; 363/65; 361/87
[58] Field of Search .................................. 307/82, 80–81, 307/86; 318/500; 361/42, 87; 363/13–16, 27, 39, 52–57, 65, 34

[56] References Cited

U.S. PATENT DOCUMENTS

| | | | |
|---|---|---|---|
| 4,589,046 | 5/1986 | Takata | 361/42 |
| 4,884,185 | 11/1989 | Hubert | 363/56 |

OTHER PUBLICATIONS

Patent Abstracts of Japan, vol. 011, No. 301 (M–628), Sep. 30, 1987, JP-A-62 092 701, Apr. 28, 1987.

Primary Examiner—A. D. Pellinen
Assistant Examiner—Michael J. Sherry
Attorney, Agent, or Firm—Oblon, Spivak, McClelland, Maier & Neustadt

[57] ABSTRACT

An electric vehicle control device including a collector for extracting power from an overhead wire and a circuit breaker for breaking the power. The power includes first AC power in AC power source zone and first DC power in DC power source zone. The device also includes a changeover device for changing over the power to apply the first AC power to an AC side or the first DC power to a DC side, a transformer connected to the AC side of the changeover device for transforming the first AC power into second AC power, a first opening/closing device, a power converter for converting the second AC power to second DC power and an inverter for converting the second DC power into third AC power. The third AC power is supplied to drive an electric motor. The device further includes a second opening/closing device, a filter inductor and a filter capacitor connected between positive and negative terminals of the DC input side of the inverter. Whereby during operation in the AC power source zone the first opening/closing device is closed and the second opening/closing device is opened, while during operation in the DC power source zone the first opening/closing device is opened and the second opening/closing device is closed.

7 Claims, 5 Drawing Sheets

ELECTRIC VEHICLE CONTROL DEVICE

BACKGROUND OF THE INVENTION

1. Field of the Invention

This invention relates to an electric vehicle control device, and in particular relates to a control device for an AC/DC electric vehicle which is to be driven straight through a zone in which the power obtained from the overhead wire is AC and a zone in which it is DC.

2. Description of the Related Art

Figure 5:
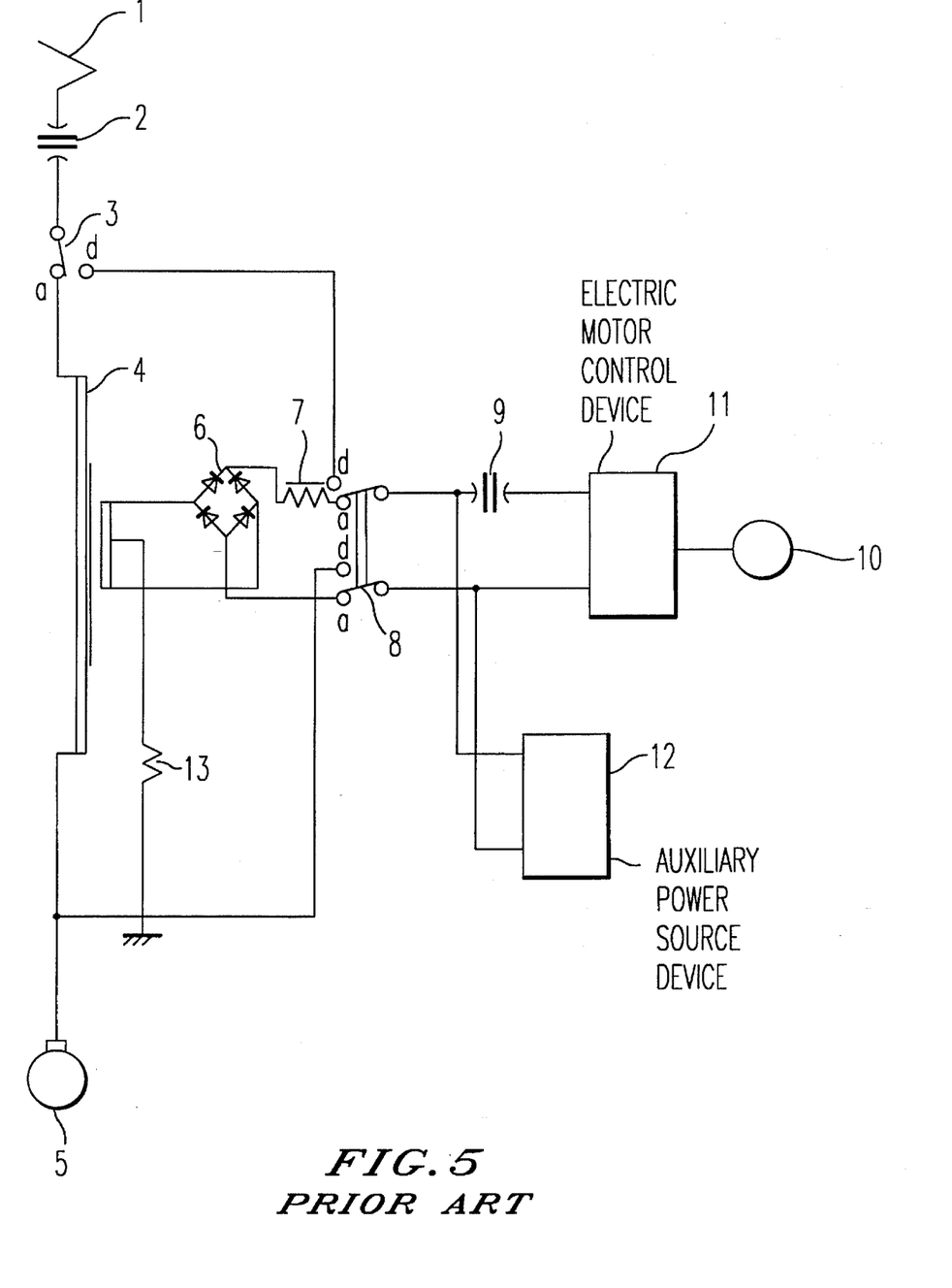
FIG. 5 is a circuit block diagram showing a conventional electric vehicle control device.

FIG. 5 shows the construction of a conventionally known electric vehicle control device for controlling an AC/DC electric vehicle. This prior art electric vehicle control device is equipped with: a collector 1 that collects power from the overhead wire (not shown), a first circuit breaker 2 for power circuit breaking, a changeover device 3 for changing over AC and DC, a transformer 4 that transforms AC power, a grounding brush 5 that grounds the AC primary current, a rectifier 6 for rectifying the AC obtained on the secondary output side of transformer 4, a smoothing inductor 7 connected to the output side of this rectifier 6, and an AC/DC converter 8 for changing over AC and DC and whose operation is linked to that of changeover device 3. There are further provided a second circuit breaker 9 arranged on the output side of AC/DC converter 8, and an electric motor control circuit 11 that drives and controls electric motor 10, whose power source is the DC power obtained on the output side of this second circuit breaker 9. Additionally, an auxiliary power source device 12 is connected in parallel with the input side of electric motor control circuit 11. Furthermore, in order to detect ground faults of the circuit in the AC power zone, there is provided a ground relay 13 between the secondary side of transformer 4 and ground. A voltage relay in employed for this relay 13.

In this prior art electric vehicle control device, in the AC power zone, AC/DC changeover device 3 and AC/DC converter 8 are arranged on the AC side a, so that AC power obtained through collector 1 and circuit breaker 2 is stepped down by transformer 4, rectified by rectifier 6 and smoothed by smoothing inductor 7. The smoothed power is then supplied to electric motor control circuit 11 through second circuit breaker 9, and also supplied to auxiliary power source device 12 without passing through the second circuit breaker 9.

In DC power source zones, AC/DC changeover device 3 and AC/DC converter 8 are changed over to the DC side d, so that DC power obtained through current collector 1 and circuit breaker 2 is supplied to electric motor control circuit 11 through second circuit breaker 9 and is also directly supplied to auxiliary power source device 12 without passing through second circuit breaker 9. Moreover, in such DC power source zones, transformer 4 is isolated from current-carrying locations by means of AC/DC changeover device 3 and AC/DC converter 8, so as to avoid DC power flowing into transformer 4 from the overhead wire.

Problems in such a prior art electric vehicle control device were that two changeover mechanisms were required for the AC/DC changeover device 3 and AC/DC converter 8 in order to effect changeover of AC and DC. This inevitably increased the size of the equipment constituting the electric vehicle control device and also made maintenance thereof burdensome.

In recent years, pulse width modulating converters are being employed using GTO thyristors instead of a rectification circuit using diodes, inverter devices are used for the electric motor control circuit, while an induction motor is employed as the electric motor, and also a static converter is used as auxiliary power source device. Selection of the most appropriate AC/DC changeover circuit is an important challenge in applying these devices to an AC/DC electric vehicle control device.

SUMMARY OF THE INVENTION

Accordingly, one object of this invention is to provide an electic vehicle control device which can be reduced in size, without adversely affecting the control and protection functions.

These and other objects of this invention can be achieved by providing an electric vehicle control device including a collector for extracting power from an overhead wire and a circuit breaker for breaking the power. The power includes first AC power in AC power source zone and first DC power in DC power source zone. The device also includes a changeover device for changing over the power to apply the first AC power to an AC side or the first DC power to a DC side, a transformer connected to the AC side of the changeover device for transforming the first AC power into second AC power, a first opening/closing means, a power converter for converting the second AC power to second DC power and an inverter for converting the second DC power into third AC power. The third AC power is supplied to drive an electic motor. The device further includes a second opening/closing means, a filter inductor and a filter capacitor connected between positive and negative terminals of the DC input side of the inverter. Whereby during operation in the AC power source zone the first opening/closing means is closed and the second opening/closing means is opened, while during operation in the DC power source zone the first opening/closing means is opened and the second opening/closing means is closed.

In the electric vehicle control device of this invention, in AC power source zones, the changeover device is set to the AC side, first opening/closing means is closed, and second opening/closing means is opened. Thereby, AC power collected by the collector is stepped down in voltage by the transformer, and the secondary output is supplied to the power converter through first opening/closing means, where it is converted to DC power, and supplied through the filter capacitor to the inverter device, so as to perform power source control of the induction motor. And in DC power source zones, the changeover device is changed over to the DC side, first opening/closing means is opened, and second opening/closing means is closed. Thereby the DC power collected by the collector is supplied directly to the inverter device through second opening/closing means, so as to perform power source control of the induction motor.

Thus, the high-frequency components generated by the converter device are blocked by the filter inductor and can be prevented from flowing into the overhead wire.

Thus, a small and reliable electric vehicle control device can be provided wherein, even though only a single AC/DC changeover means is provided, it can be ensured that there is no possibility of high frequency components from the inverter device flowing into the overhead wire, due to the presence of the filter inductor, and wherein fault current such as when there is a power source short circuit fault of the auxiliary power source device can be restricted.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Referring now to the drawings, wherein like reference numerals designate identical or corresponding parts throughout the several views, the embodiments of this invention will be described below.

Figure 1:
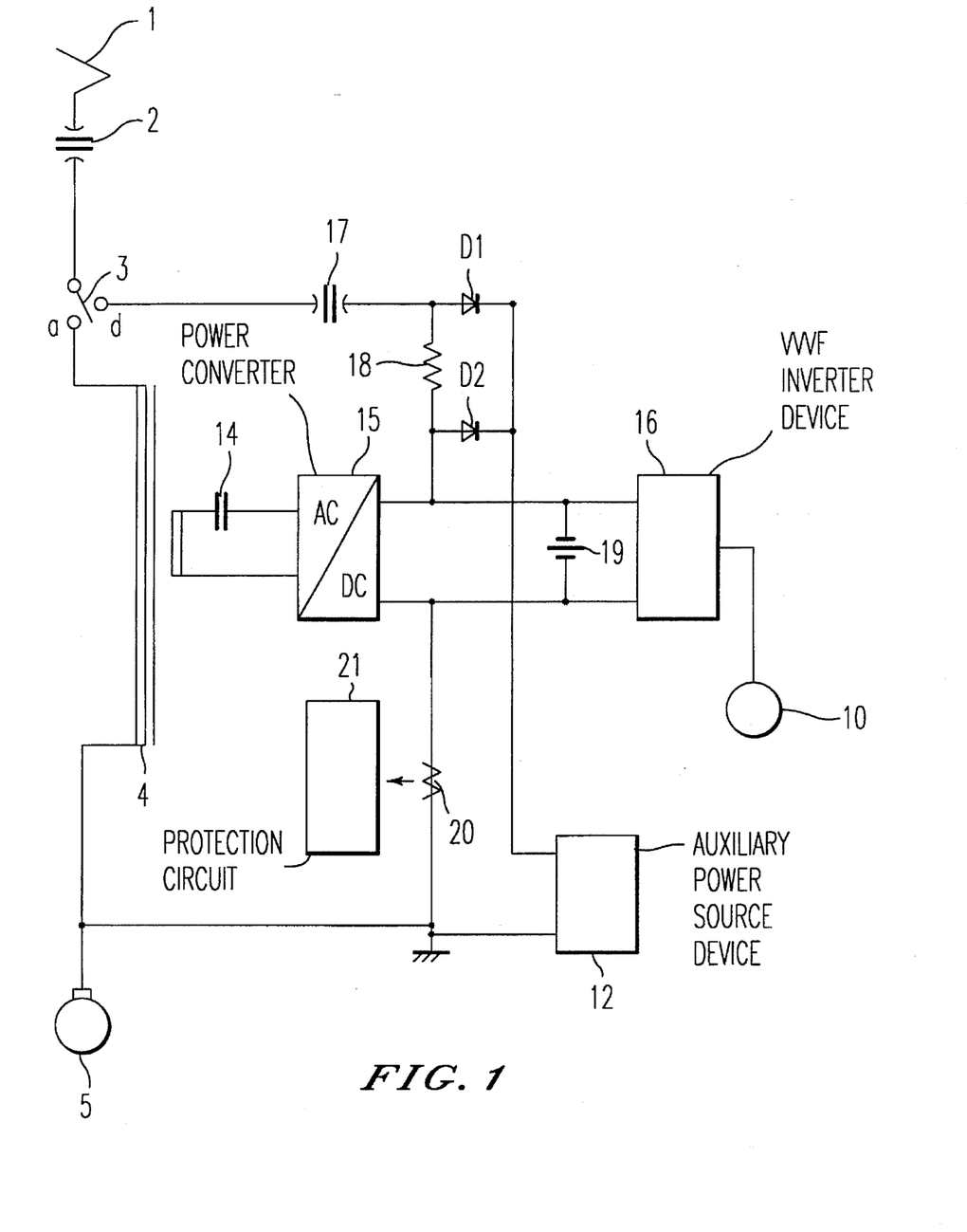
FIG. 1 is a circuit block diagram showing an electric vehicle control device according to an embodiment of this invention.

FIG. 1 is a circuit block diagram of an embodiment of this invention. In FIG. 1, there are provided: collector 1 for collecting power from the overhead wire (not shown), circuit breaker 2 connected to collector 1 for performing power circuit breaking, changeover device 3 for changing over the power obtained from the overhead wire through collector 1 and circuit breaker 2 between AC side a and DC side d, transformer 4 connected to the AC output side of this changeover device 3. There are further provided: a contactor 14 provided as first opening/closing means on the secondary output side of this transformer 4, a power converter 15 connected to the secondary output of transformer 4 through this contactor 14 for converting AC power to DC power, and a VVVF inverter device 16 connected to the DC output terminal of this power converter 15.

Furthermore, a circuit breaker 17 provided as second opening/closing means and a filter inductor 18, connected in series between the positive terminal of the DC input side of inverter device 16 and the DC side d of the aforesaid AC/DC changeover device 3, and a filter capacitor 19 connected between the positive and negative terminals of the DC input side of inverter device 16 are provided.

Furthermore, the anode of one diode D1 is connected to one end of filter inductor 18, while the anode of another diode D2 is connected to the other end of filter inductor 18. A positive power source terminal of auxiliary power source device 12 is connected to the point of connection of the cathodes of these two diodes D1 and D2. A negative power source terminal of auxiliary power source device 12 is connected to the vehicle body earthing point.

Yet further, a current detector 21 is provided between the vehicle body earthing point and the point of connection of the negative terminal of the DC output side of power converter 15 and the negative terminal of the DC input side of inverter device 16. Current detector 20 functions as both circuit ground fault detecting means and input overcurrent detection means for auxiliary power source device 12 in the AC power source zone. A protection circuit 21 is arranged To perform protective action in response to the detection signal produced by current detector 20.

Motor 10 is an induction motor and is driven by the AC output of inverter device 16. 5 is an earthing brush as in the prior art example.

Figure 2:
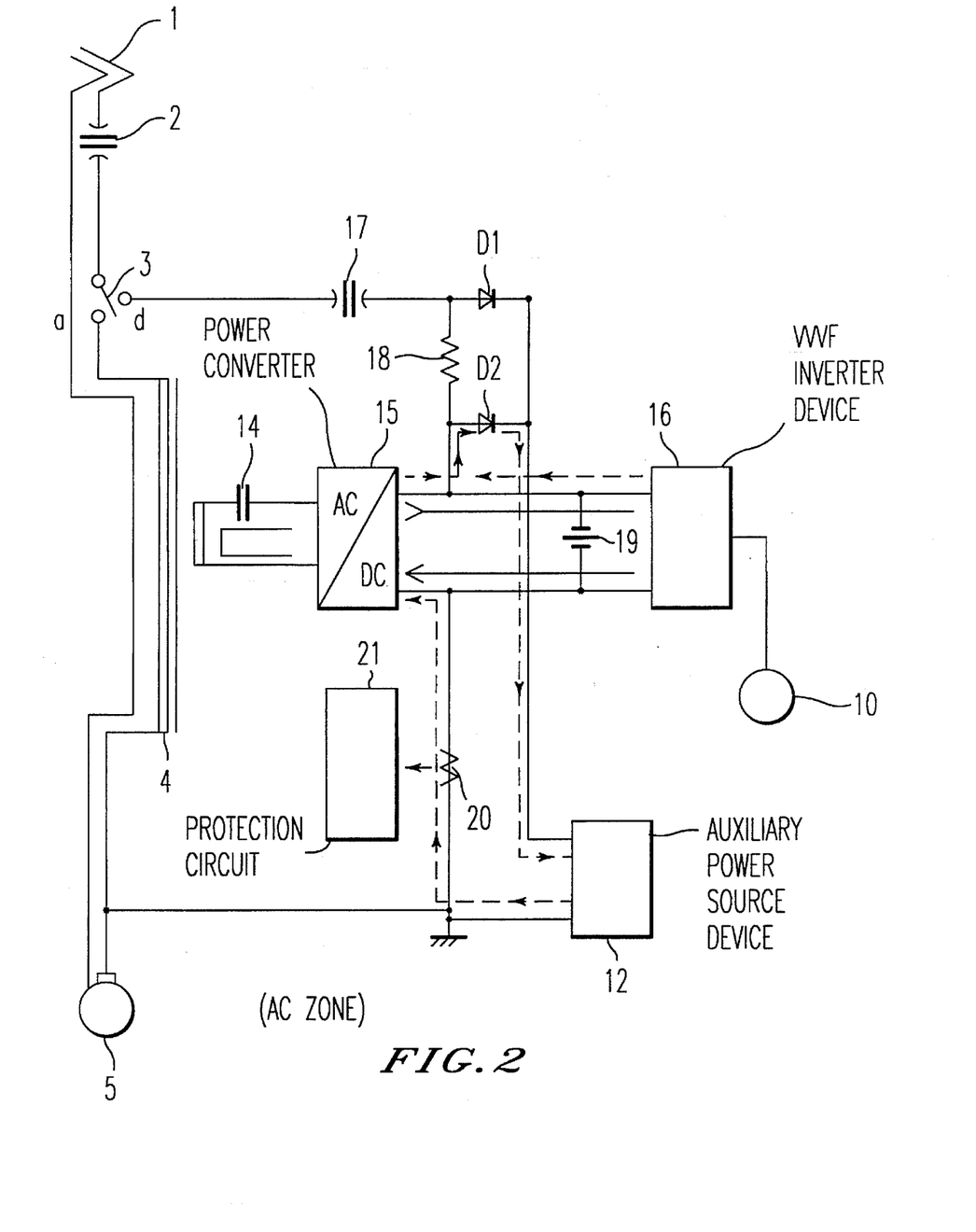
FIG. 2 is a view showing current flow paths in AC power source zone in the embodiment of FIG. 1.
Figure 3:
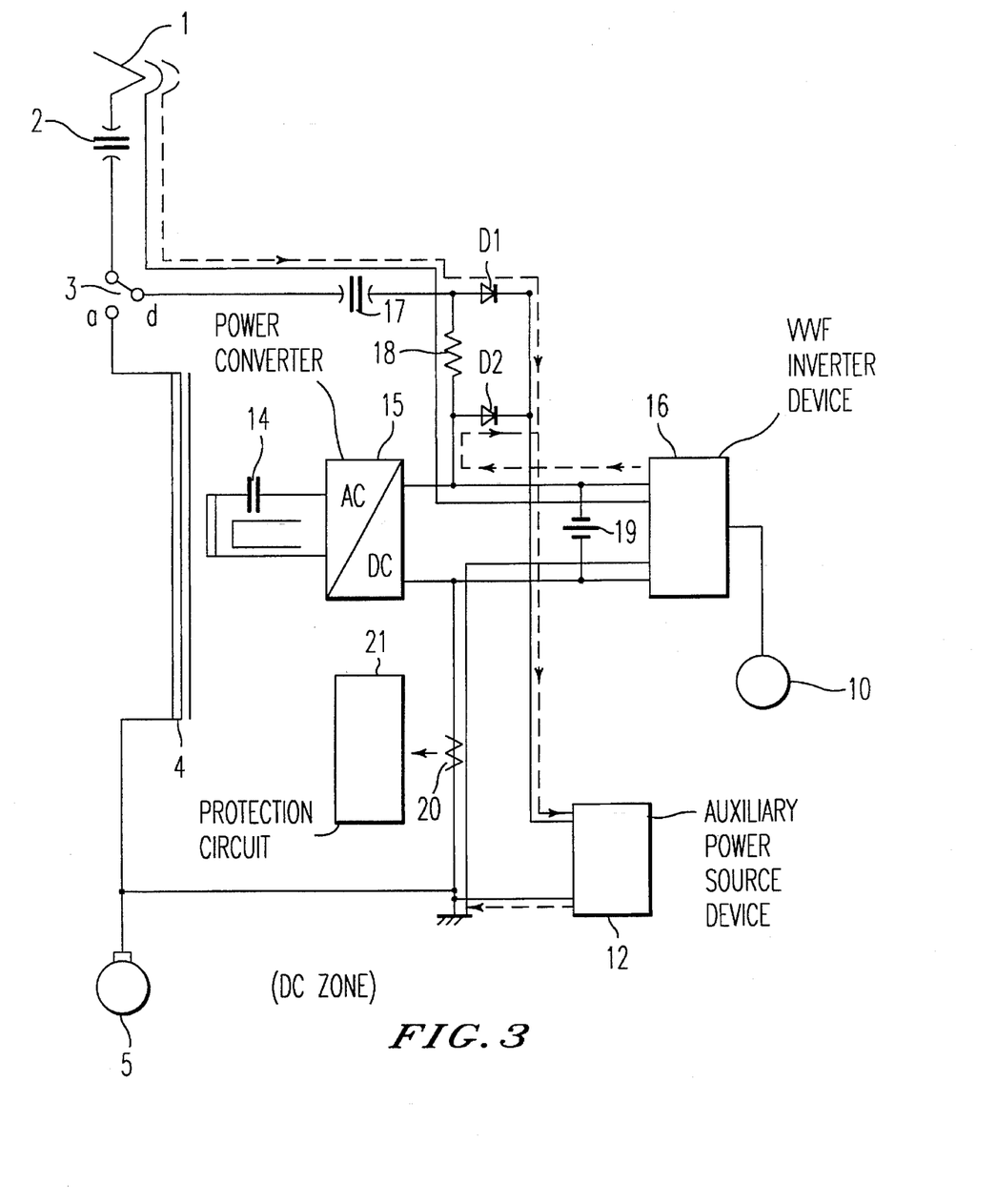
FIG. 3 is a view showing current flow paths in DC power source zone in the embodiment of FIG. 1.

Next, the current flow paths in the electric vehicle control device constructed as described above will be explained with reference to FIGS. 2 and 3. FIGS. 2 and 3 show the current flow paths in AC and power source zones, respectively.

In FIG. 2, AC current flows between collector 1 and grounding brush 5 through circuit breaker 2, AC side a of AC/DC changeover device 3 and primary side of transformer 4, as shown in solid line. DC current flows from the positive terminal of DC output side of power converter 15 to the positive terminal of DC input side of inverter device 16, and flows from the negative terminal of DC input side of inverter device 16 to the negative terminal of DC output side of power converter 15, as shown in solid lines.

During operation under power, DC current flows from the positive terminal of DC output side of power converter 15 the positive input terminal of auxiliary power source device 12 through diode D2, and flows from the negative input terminal of auxiliary power source device 12 to the negative terminal of DC output side of power converter 15, as shown in dotted lines.

During operation in regenerative breaking, DC current flows from the positive terminal of DC input side of inverter device 16 to the positive input terminal of auxiliary power source device 12 through diode D2, and flows from the negative input terminal of auxiliary power source device 12 to the negative terminal of DC output side of power converter 15, as shown in dotted lines.

In FIG. 3, DC current flows from collector 1 to the positive terminal of DC input side of inverter device 16 through circuit breaker 2, DC side d of AC/DC changeover device 3, circuit breaker 17 and filter inductor 18, and flows from the negative terminal of DC input side of inverter device 16 to the ground, as shown in solid lines.

During operation under power, DC current flows from collector 1 to the positive input terminal of auxiliary power source device 12 through circuit breaker 2, DC side d of AC/DC changeover device 3, circuit breaker 17 and diode D2, and flows from the negative input terminal of auxiliary power source device 12 to the ground, as shown in dotted lines.

During operation in regenerative breaking, DC current flows from the positive terminal of DC input side of inverter device 16 to the positive input terminal of auxiliary power source device 12 through diode D2, and flows from the negative input terminal of auxiliary power source device 12 to the ground, as shown in dotted lines.

Next, the operation of the electric vehicle control device constructed as above will be described.

In the AC power source operating zone, AC/DC changeover device 3 is set to the AC side a, and contactor 14 is kept in closed condition, whereas, in contrast, circuit breaker 17 is kept in open condition. The AC power obtained through collector 1 and circuit breaker 2 is thereby stepped down by transformer 4, converted to DC power by power converter 15, and input to inverter device 16 through filter capacitor 19. Inverter device 16 converts the received DC power into AC power and drives induction motor 10 under VVVF control. In this case, if a four-quadrant converter is employed for power converter 15, power regeneration breaking action is also possible.

In contract, in the DC power source operating zones, AC/DC changeover device 3 is changed over to the DC side d, contactor 14 is opened, and circuit breaker 17 is closed. The DC power obtained through collector 1 and circuit breaker 2 is thereby input to inverter device 16 through circuit breaker 17 and filter inductor 18. Filter inductor 18 prevents high frequency component generated by switching action performed by inverter device 16 from flowing into the overhead wire, and acts to limit fault currents such as power short circuit faults of auxiliary power source device 12.

Thus, even though only a single changeover device 3 is employed as the AC/DC changeover mechanism, power conversion and power control can be achieved for both AC and DC power sources. This makes it possible to reduce the size of the equipment constituting electric vehicle control device.

Auxiliary power source device 12 is provided to supply the power for air conditioning equipment and illumination equipment etc. Since the power for auxiliary power source device 12 is obtained through the two diodes D1, D2 connected to both ends of filter inductor 18 without going through filter inductor 18, whether during operation under power or in regenerative breaking, and whether in AC power source zones or DC power source zones. This enables the circuit constants of the power source side as seen from auxiliary power source device 12 therefore always to be kept constant. Thus the external disturbances to control of the auxiliary power source device 12 that would be produced by change of the circuit constants of the power source side can be prevented. This therefore also enables the current capacity of filter inductor 18 to be reduced.

Normally, only power source current of auxiliary power source device 12 will flow in current transformer 20 provided between the earthing point and the negative electrode side of the wire connecting power converter 15 and inverter device 16. If a ground fault occurs at some location that is at other than the proper grounding potential of the circuit, a large current that is larger than such power source current will flow. If therefore the large current is detected by current transformer 20 in the AC power source operating zone, this is regarded as a ground fault, protective circuit 21 is actuated and circuit breaking action is performed by circuit breaker 2, thereby cutting off the input of overhead wire power to protect the circuit.

Furthermore, if the input current increases excessively due to the fault of auxiliary power source device 12 and thus the large curent is detected by current transformer 12, the same protection as described above, in particular the protection of power converter 15, can be performed.

Figure 4:
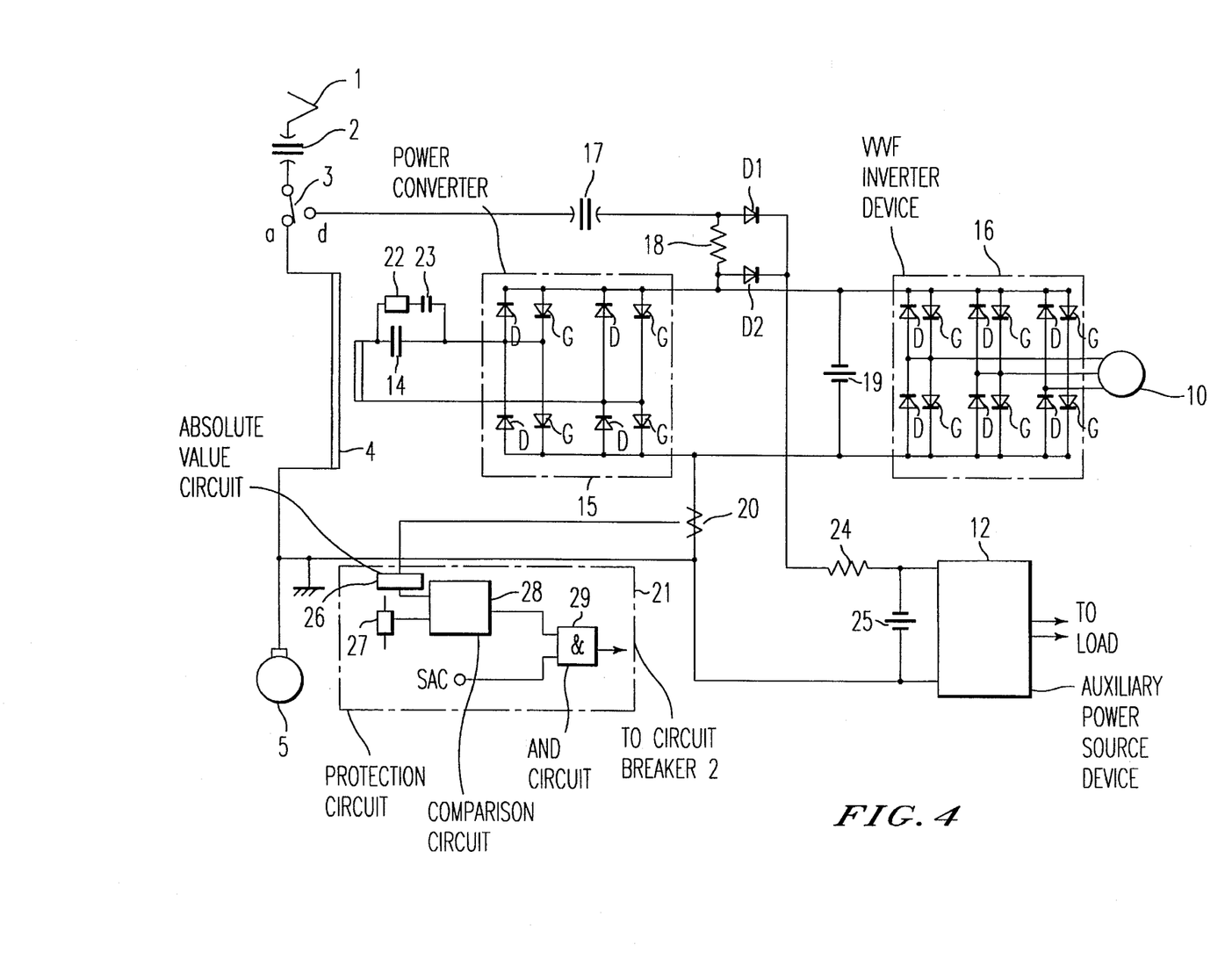
FIGS. 4 is a circuit block diagram showing the circuit construction of the embodiment of FIG. 1 in more detail.

The layout of this embodiment of the invention is shown in more detail in FIG. 4. Parts which are the same as in the circuit shown in FIG. 1 are indicated by the same reference numerals. In the electric vehicle control device of this embodiment, the case is shown where power converter 15 is constituted by a single phase bridge circuit of diodes D and GTO thyristors G, while the inverter device 16 is also constituted by a three phase bridge circuit of ordinary diodes D and GTO thyristors G. And, in this embodiment, on the secondary output side of transformer 4, there is provided a first opening/closing means constituted by contactor 14. There is also provided a series circuit of a second contactor 23 and a resistor 22 in parallel with contactor 14. This resistor 22 and second contactor 23 are for initial charging up of filter capacitor 19; they are only actuated in commencement of operation in an AC zone; contactor 23 is subsequently put into closed condition.

Furthermore, auxiliary power source filter inductor 24 and filter capacitor 25 are provided on the input side of auxiliary power source device 12 in order to avoid the effect of high frequencies on the power source and to smooth DC voltage. Since the power source of auxiliary power source device 12 is obtained through diode D1 or D2, there is no possibility of filter inductor 18 getting inserted in series with auxiliary power source filter inductor 24. Consequently, there is no necessity to alter the control constants of auxiliary power source device 12 whether for AC power source zones or DC power source zones, or for running under power or regenerative breaking.

Protection circuit 21 that performs the protection action of circuit breaker 2 on receiving the detection signal from current transformer 20 is constituted of: an absolute value circuit 26 for the voltage signal indicating detected current; a comparison circuit 28 that compares the output from this absolute value circuit 26 with a reference voltage from a reference voltage setter 27; and an AND circuit 29 that outputs a circuit breaking actuation signal to circuit breaker 2 under AND logic of an AC power source zone condition signal SAC and the output of comparison circuit 28.

Consequently, if a voltage signal is input to absolute value circuit 26 as a result of current detection by current transformer 20, comparator circuit 28 compares the absolute value of this input voltage signal with the reference voltage. If the input signal is greater, and this occurs in an AC power source zone, AND circuit 29 outputs an actuation signal to circuit breaker 2, causing circuit breaker 2 to perform circuit breaking action to protect the circuit.

Thus, by employing only a single changeover device 3 as AC/DC changeover means, this embodiment can also cope with both AC power source zone and DC power source zone, and the size of the equipment constituting electric vehicle control device can be reduced.

Thus, with this invention, in AC power source zones, power source control of the induction motor is performed by setting the changeover device to the AC side, closing first opening/closing means and opening second opening/closing means, so that AC power that is extracted from the collector is stepped down by the transformer to obtain a secondary output which is supplied through first opening/closing means to the power converter, where it is converted to DC power, which is supplied to the inverter device through the filter capacitor. In DC power source zones, power source control of the induction motor is performed by changing over the changeover device to the DC side, opening first opening/closing means, and closing second opening/closing means, whereby DC power extracted from the collector is supplied through second opening/closing device directly to the inverter device. Thus, even though only a single AC/DC changeover means is provided, due to the presence of the filter inductor, high frequency components from the inverter device cannot flow into the overhead wiring, and fault currents due to power source short circuit faults of the auxiliary power source device can be restricted. A small but reliable electric vehicle control device can thereby be obtained.

Also with this invention, owing to the fact that the anode of one diode is connected to one end of the filter inductor while the anode of another diode is connected to the other end of the filter inductor, and a Dower source terminal of the auxiliary power source device is connected to the point of connection of the cathodes of these two diodes, a stable auxiliary power source can be guaranteed since the power to the auxiliary power source is extracted without going through the filter inductor both in AC zone and in DC zone.

Also with this invention, since a current sensor is provided between the point of connection of the negative terminals of the DC output side of the power converter and the DC input side of the inverter device and the earthing point of the vehicle body, this being used as the circuit ground fault detection means and the input overcurrent detection means for auxiliary power source device in AC power source zones, a circuit protection action can be achieved in which occurrence of ground fault current and/or the input overcurrent are reliably detected in AC power source zones.

Obviously, numerous modifications and variations of the present invention are possible in light of the above teachings. It is therefore to be understood that within the scope of the appended claims, the invention may be practiced otherwise than as specifically described herein.

What is claimed is:

1. An electric vehicle control device, comprising:
   a collector for extracting power from an overhead wire;
   said power including first AC power in AC power source zone and first DC power in DC power source zone;
   a circuit breaker connected to said collector for breaking said power;
   a changeover device connected to circuit breaker for changing over said power obtained from said overhead wire through said collector and said circuit breaker to apply said first AC power to an AC side or said first DC power to a DC side;
   a transformer connected to said AC side of said changeover device for transforming said first AC power into second AC power;
   first opening/closing means connected to a secondary output side of said transformer;
   a power converter connected to receive said second AC power through said first opening/closing means for converting said second AC power to second DC power;
   an inverter connected to receive said second DC power from a DC output side of said power converter for converting said second DC power into third AC power;
   said third AC power being supplied to drive an electric motor;
   a series circuit of a second opening/closing means and a filter inductor, connected between said DC side of said changeover device and a DC input side of said inverter; and
   a filter capacitor connected between positive and negative terminals of said DC input side of said inverter;
   positive terminals of said DC output side of said power converter and said DC input side of said inverter being connected;
   negative terminals of said DC output side of said power converter and said DC input side of said inverter being connected and earthed;
   whereby during operation in said AC power source zone said first opening/closing means being closed and said second opening/closing means being opened, while during operation in said DC power source zone said first opening/closing means being opened and said second opening/closing means being closed.

2. The electric vehicle control device according to claim 1, further comprising:
   a first diode, an anode of which being connected to a first terminal of said filter inductor;
   a second diode, an anode of which being connected to a second terminal of said filter inductor; and
   an auxiliary power source device, a positive terminal of which being connected to a point of connection of cathodes of said first and second diodes, and a negative terminal of which being earthed.

3. The electric vehicle control device according to claim 1, further comprising:
   a current sensor for detecting a current flowing between a connection point of said negative terminal of said DC output side of said power converter and said negative terminal of said DC input side of said inverter and an earthing point; and
   protection means connected to receive said current detected by said current sensor for protecting said electric vehicle control device from a circuit ground fault or an input overcurrent fault of said auxiliary power source device based on said current.

4. The electric vehicle control device according to claim 1, wherein:
   said power converter includes a single phase bridge circuit including parallel circuits of a diode and a GTO thyristor.

5. The electric vehicle control device according to claim 1, wherein:
   said inverter includes a three phase bridge circuit including parallel circuits of a diode and a GTO thyristor, and functions as a VVVF inverter.

6. The electric vehicle control device according to claim 3, wherein said protection means includes:
   a setter for setting a reference current value;
   a comparison circuit for comparing said current detected by said current sensor and said reference current value; and
   output means connected to said comparison circuit for generating a protection signal if said current detected by said current sensor is larger than said reference current value and said electric vehicle is in said AC power source zone;
   said protection signal being supplied to open said circuit breaker.

7. An electric vehicle control device, comprising:
   a collector for extracting power from an overhead wire;
   said power including first AC power in an AC power source zone and first DC power in a DC power source zone;
   a circuit breaker connected to said collector for breaking said power;
   a changeover device connected to said circuit breaker for changing over said power obtained from said overhead wire through said collector and said circuit breaker to apply said first AC power to an AC side or said first DC power to a DC side;
   a transformer connected to said AC side of said changeover device for transforming said first AC power into second AC power;
   first opening/closing means connected to a secondary output side of said transformer;
   a power converter connected to receive said second AC power through said first opening/closing means for converting said second AC power to second DC power;
   an inverter connected to receive said second DC power from a DC output side of said power converter for converting said second DC power into third AC power;
   said third AC power being supplied to drive an electric motor;
   a series circuit of a second opening/closing means and a filter inductor, connected between said DC side of said changeover device and a DC input side of said inverter; and a filter capacitor connected between positive and negative terminals of said DC input side of said inverter;

positive terminals of said DC output side of said power converter and said DC input side of said inverter being connected;

negative terminals of said DC output side of said power converter and said DC input side of said inverter being connected and earthed;

a first diode, an anode of which being connected to a first terminal of said filter inductor;

a second diode, an anode of which being connected to a second terminal of said filter inductor;

an auxiliary power source device, a positive terminal of which being connected to a point of connection of cathodes of said first and second diodes, and a negative terminal of which being earthed;

a current sensor for detecting a current flowing between a connection point of said negative terminal of said DC output side of said power converter and said negative terminal of said DC input side of said inverter and an earthing point; and protection means connected to receive said current detected by said current sensor for protecting said electric vehicle control device from a circuit ground fault or an input overcurrent fault of said auxiliary power source device based on said current, whereby during operation in said AC power source zone said first opening/closing means being closed and said second opening/closing means being opened, while during operation in said DC power source zone said first opening/closing means being opened and said second opening/closing means being closed.

* * * * *